April 18, 1933.  C. E. BREADEN  1,904,614
WEIGHING SCALE
Filed April 18, 1930   2 Sheets-Sheet 2
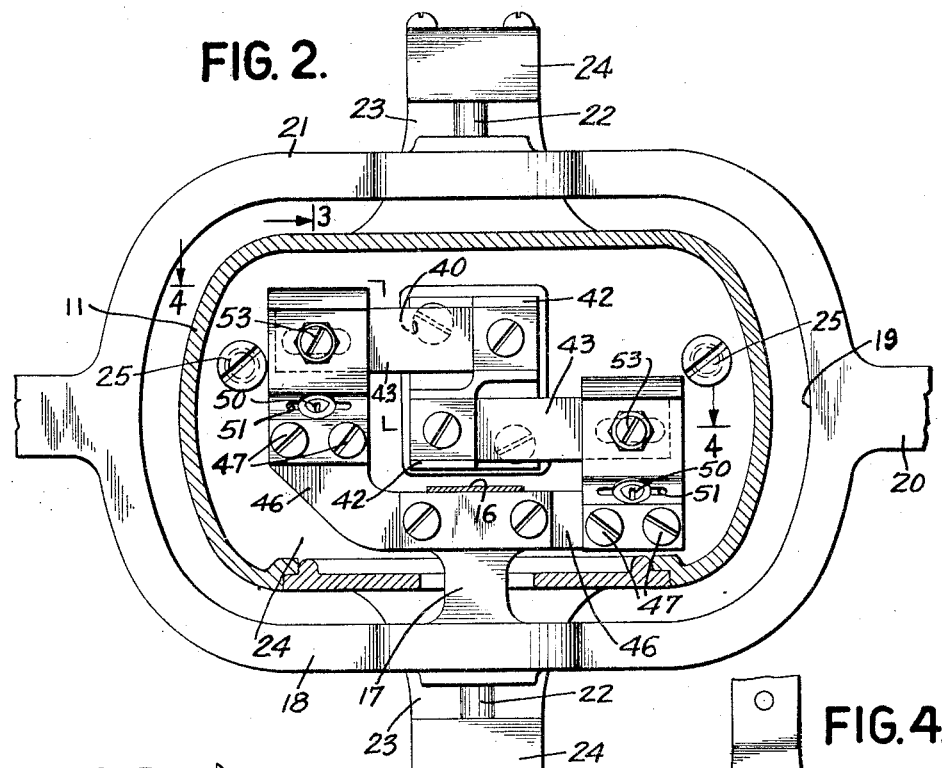
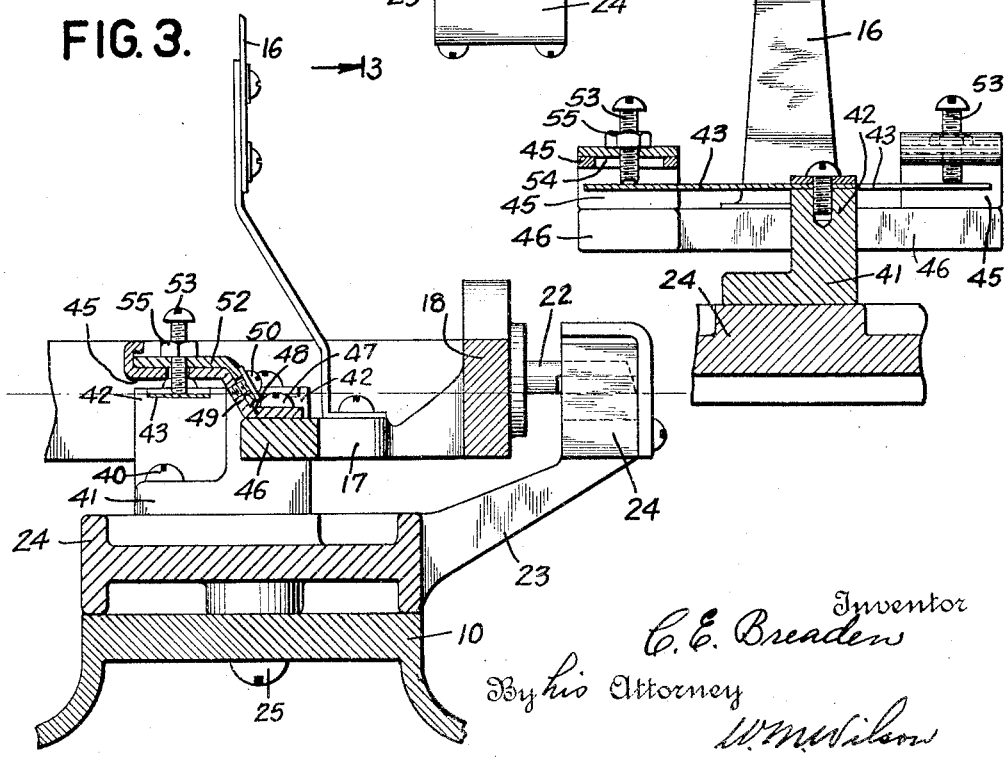

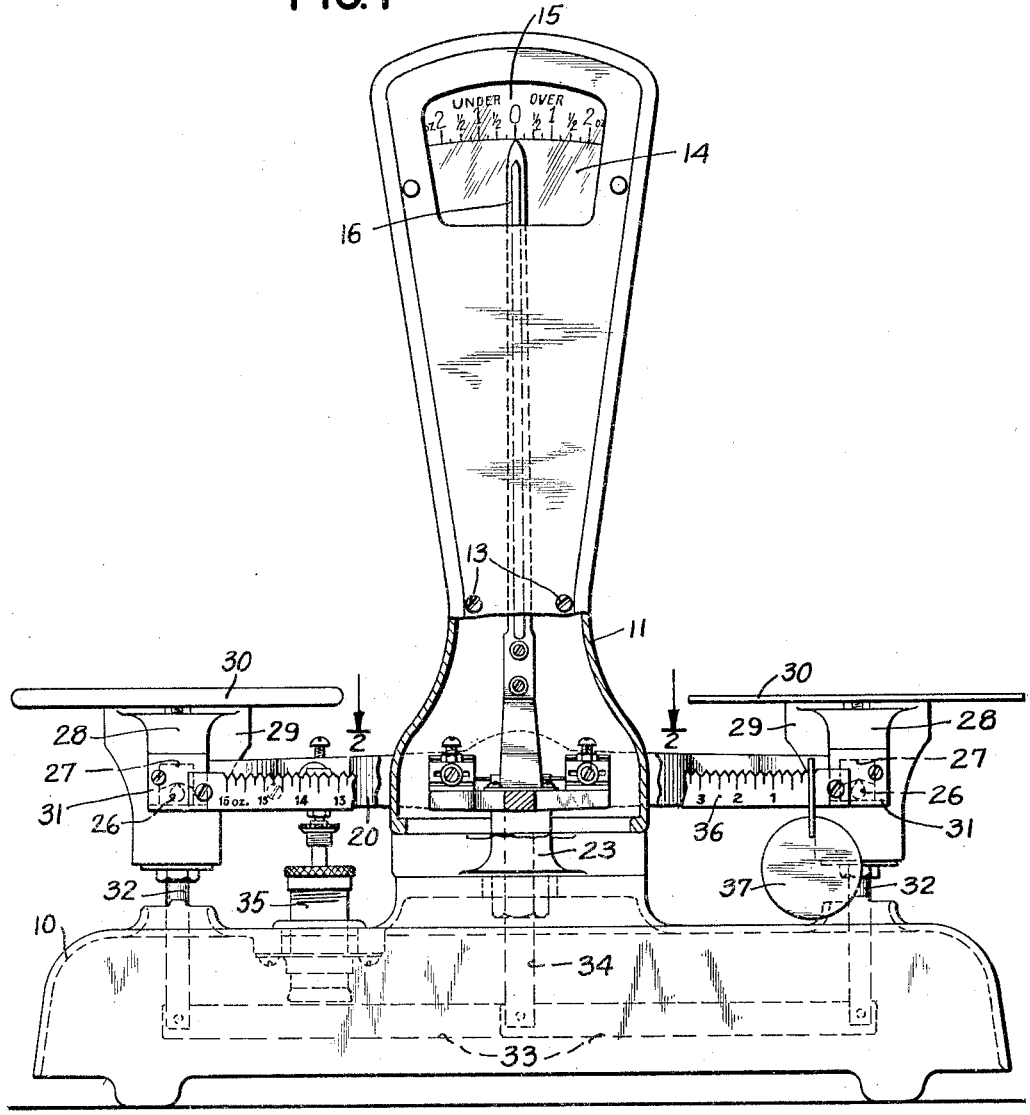

Patented Apr. 18, 1933

1,904,614

UNITED STATES PATENT OFFICE

CARROLL E. BREADEN, OF DAYTON, OHIO, ASSIGNOR TO DAYTON SCALE COMPANY, OF DAYTON, OHIO, A CORPORATION OF NEW JERSEY

WEIGHING SCALE

Application filed April 18, 1930. Serial No. 445,334.

This case relates to weighing scales of the even-balance type.

The object of this invention is to provide novel counterbalancing means for coordinating the action of the platforms to a graduated chart.

Further, the object of the invention is to provide a novel sealing means for adjusting the scale to the zero point of the chart.

Still further, an object is to provide counterbalancing springs which are free of influence on the scale beam when the latter is at zero position.

The object is also to provide a pair of springs, one of which resists movement of the beam in one direction and the other of which resists movement of the beam in the opposite direction, the springs acting independently and being effective only one at a time by influencing the beam.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawings:

Fig. 1 is a front view of the scale with part of the case in section to show the interior mechanism.

Fig. 2 is a section on line 2—2 of Fig. 1.

Fig. 3 is a section on line 3—3 of Fig. 2, and

Fig. 4 is a section on line 4—4 of Fig. 2.

Referring to the drawings in detail, the scale comprises a hollow base 10 from which extends upwardly a housing 11, the front of which has removably secured thereto by screws 12 a cover 13. The housing and cover are provided at the upper ends with alined sighting windows 14 through which may be viewed a chart 15 fixed to the housing between the windows. The chart has under and over indications on both sides which are scanned by an indicator 16 moving along the bottom of the chart.

The indicator 16 is fixed at its lower end to a horizontal inwardly extending lug 17 of one of the furcations 18 of the central loop 19 of the even balance beam 20.

The loop 19 surrounds the vertical housing 11 and has in the furcation 18 and in the opposite furcation 21 knife edges 22 extending outwardly therefrom which are seated in the usual scale bearings carried by the upstanding ears 23 of a frame piece 24 fastened to the base 10 by screws 25.

The beam 20 carries at each end knife edges 26 on which are seated the V-shaped agate blocks 27 fixed into the depending ears 28 integral with the supports 29 carrying pans 30. Thrust plates 31 are provided for knife edges 25 and 22.

To prevent tipping of the supports 28, they are provided with depending stems 32 which at their lower ends are pivoted to check rods 33 pinned to each other and to a rod 34 fixed to the frame at the same point, which is in line with the fulcrum of the beam.

The beam is connected to the usual dash pot 35 for damping its oscillations. The beam also has fixed to it the graduated tare beam 36 on which is movable the poise 37.

In order to coordinate the movement of the beam to the chart 15, the following counterbalancing mechanism is employed.

The frame piece 24 has rigidly fastened to its upper surface by means of screws 40 a block 41 which is formed with diagonally opposite upstanding integral lugs 42. The upper faces of lugs 42 are in the same plane as the range line of the scale beam 20. To the upper face of each lug is secured a flat spring 43. The flat springs extend horizontally and parallel to each other but in opposite directions. When bent downwardly, the springs flex on those edges of lugs 42 which are in line with each other and also in line with the fulcrum of the even balance beam. This is found to be best in practice, avoiding the possibility of error due to application of the spring forces at different angles to the beam connections to the springs with different displacements of the beam. These connections comprise plates 45, one on each arm 46 extending horizontally and oppositely from lug 17 of the beam loop 19. The plate 45 is fastened to the corresponding arm 46 by screws 47 passing through the lower flat portion 48 of the plate (see Fig. 3). An intermediate portion 49 of the plate is provided with a screw 50 which fits in a horizontal slot 51 in the lower angular portion of a plate 52. The upper horizontal portion of the plate 52 is provided with a screw 53 which is seated in a slot 54 formed in the contacting portion of the plate 45 and parallel to slot 51 in the plate 52. The plates 45 and 52 are held to each other by screw 50 which when loosened permits the plate 52 to be moved in the direction of the slot 51. To further guide the plate 52 in this adjusting movement on plate 45, the latter at its upper and outer free end is folded over to form a guideway projecting over the upper free end of the plate 52.

The screw 53 bears at its lower end on the associated leaf spring 43 and is adjustable vertically in any relative position of plates 45 and 52 to adjust the pressure of the spring on the screw.

After adjustment of the screw 53 it is held locked by nut 55. The movement of the beam 20 clockwise, as viewed in Fig. 1, is resisted only by the right hand spring 43 engaging the associated screw 53. The movement of the beam counterclockwise is resisted only by the left hand spring 43.

To seal the scale so that the graduations of chart 15 accurately indicate the movement of the pointer 16, the plates 52 are adjusted along the plates 45 to provide a rough adjustment. Screws 53 are then adjusted to provide a final sensitive adjustment.

The springs 43 act not only as counterbalances but prevent errors due to placing the scale on an incline. Thus, movement of the pointer and beam relative to the housing when there is no load on the scale is prevented by engagement of the leaf springs with the screws 53, regardless of the angle within ordinary practical limits at which the scale is supported.

It will be understood that while the scale base 10, frame part 24, and housing 11 are made separate, it is within the scope of the present invention to make either of these parts integral with either or both of the other parts.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. A scale comprising a beam, a frame relative to which the beam is pivoted, and a counterbalancing spring connected to the frame and to the beam to extend substantially in the same plane as the pivotal axis of the beam and in a direction substantially longitudinal of the beam, and horizontally movable means for adjusting the connection of the beam and spring longitudinally of the latter.

2. An even balance scale comprising a frame, an upstanding housing, a chart in said housing, a beam fulcrumed on said frame and carrying a weight pan at each end and having an indicator for scanning said chart, a horizontal leaf spring located in said housing and connected to the frame, means extending from and connected to the beam, and a member slidable on the aforesaid means longitudinally of the spring for flexing the latter in accordance with the movement of the beam.

3. An even balance scale comprising a stationary member, a beam pivoted relatively thereto, a leaf spring connected to said member, and tending to flex relative to the member along a line substantially coincident with the fulcrum of the beam, and connections from the beam to the spring adjustable longitudinally of the beam for variably flexing the spring in accordance with movement of the beam.

4. An even balance scale comprising a frame, a beam pivotally movable relative to the frame, a leaf spring secured to the frame, and a device connected to and adjustable longitudinally of the beam for engaging the leaf spring to flex it according to movement of the beam.

5. An even balance scale comprising a frame, a beam fulcrumed thereon and carrying a load pan at each end, a leaf spring connected to said frame and extending substantially in the same direction as the beam when the latter is in zero position, connections from the beam to the spring, including a part slidably adjustable longitudinally of the beam for coacting with the spring for variably displacing the latter through substantially the same angles as the beam upon movement thereof from the zero position.

6. An even balance scale comprising a frame, a lug carried thereby and projecting therefrom and provided with a substantially horizontally extending support, a leaf spring extending substantially horizontally from said lug and fastened to said support, an even balance beam, and connections therefrom adjustable longitudinally of the spring for flexing the latter upon displacement of the beam.

7. An even balance scale comprising a frame, a beam pivotally movable relative to the frame, a leaf spring secured to the frame and extending substantially in the same direction as the beam, and a connecting device between the beam and said spring for flexing the latter, said connecting device and spring being relatively adjustable to vary the effect of the beam on the spring.

8. A scale comprising a beam for supporting a pan at each end, a frame relative to which said beam is pivoted, a spring carried by said frame and extending substantially horizontally and adjustable sealing connections between the free end of the spring and beam for varying the effect of the beam on the spring.

9. A scale comprising a beam for carrying a pan at each end, a frame on which said beam is fulcrumed, a hollow upstanding casing rigid with said frame, a spring located inside said casing and attached to said frame, and adjustable connections between said spring and beam, there being two springs, each effective to resist opposite movements of the beam.

10. In a scale of the even balance type, an even balance beam carrying a load support at each end, a leaf spring extending substantially horizontal and in the same direction as the beam, means for mounting one end of the spring to flex along a line substantially coincident with the pivotal axis of the beam, and a device connected to the beam engageable with, and adjustable lengthwise of the spring for flexing the spring in accordance with movements of the beam.

11. In an even balance scale, an even balance beam, two leaf springs extending in opposite directions from the axis of the beam and adapted to flex along a line coincident with the axis and two connecting devices, one between each spring and each arm of the beam whereby opposite movements of the beam are resisted by one spring at a time.

In testimony whereof I hereto affix my signature.

CARROLL E. BREADEN.